United States Patent

Cucinella et al.

[11] Patent Number: 6,160,080
[45] Date of Patent: Dec. 12, 2000

[54] POLYAMIDE, METHOD FOR ITS MANUFACTURE AND COMPOUNDS CONTAINING IT

[75] Inventors: Antonino Cucinella, Bernalda; Giuseppe Di Silvestro, Lentate Sul Seveso; Cesare Guaita, Tradate; Franco Speroni, Ceriano Laghetto; Haichun Zhang, Marconia, all of Italy

[73] Assignee: Nyltech Italia, Laghetto, Italy

[21] Appl. No.: 09/077,996

[22] PCT Filed: Dec. 27, 1996

[86] PCT No.: PCT/EP96/05847

§ 371 Date: Sep. 14, 1998

§ 102(e) Date: Sep. 14, 1998

[87] PCT Pub. No.: WO97/24388

PCT Pub. Date: Jul. 10, 1997

[30] Foreign Application Priority Data

Dec. 29, 1995 [FR] France .................................. 95 15878
Dec. 29, 1995 [IT] Italy .................................. MI95A2779

[51] Int. Cl.⁷ .......................... C08G 69/02; C08G 69/04; C08G 69/16; C08G 69/36
[52] U.S. Cl. .......................... 528/170; 528/310; 528/312; 528/322; 528/323; 528/326; 528/332; 528/335; 528/336; 524/600; 524/606
[58] Field of Search ...................... 528/170, 310, 528/322, 323, 326, 312, 332, 335, 336; 524/600, 606

[56] References Cited

U.S. PATENT DOCUMENTS 3,549,601  12/1970  Fowell .................................. 528/310
5,346,984  9/1994  Hasegawa et al. ..................... 528/323

FOREIGN PATENT DOCUMENTS 0 345 648  12/1989  European Pat. Off. .

*Primary Examiner*—P. Hampton-Hightower
*Attorney, Agent, or Firm*—Burns, Doane, Swecker & Mathis, L.L.P.

[57] ABSTRACT

The invention relates to a polyamide, a method for its manufacture and compounds containing it. It involves, specifically, a polyamide obtained through polymerization of an aminoacid or lactam such as caprolactam in the presence of a compound having at least three functions capable of generating an amide function by reacting either with an amine function or with an acid fonction. The polyamide obtained in this way has at least part of these molecular chains in a star formation, the other part being in linear form. This polymer is useful, inter alia, in the manufacture of compounds that are to be molded, since it has minimal viscosity in a melted medium while still retaining the mechanical properties of a linear polymer.

38 Claims, No Drawings

POLYAMIDE, METHOD FOR ITS MANUFACTURE AND COMPOUNDS CONTAINING IT

The present invention relates to a polyamide comprising macromolecular chains with a different chemical structure and to a process for its manufacture, as well as to compositions containing it.

It relates more particularly to a polyamide composed of polymer units exhibiting a star configuration and, optionally, linear polymer units.

The use of linear aliphatic or semiaromatic polyamides as plastic forming the matrix of a composition intended to be shaped has been known for a very long time. In order to improve the mechanical properties of these plastics, these compositions comprise fillers in the powder or fibre form, such as, for example, glass fibres. However, these fillers result in an increase in the viscosity of the composition in molten medium, or more generally limit the rate of flow of the composition when the latter is injected into a mould. In order to obtain correct filling of moulds or a rapid moulding rate, it is necessary to limit the amount of filler in the composition. Thus, the maximum concentrations allowable are generally in the region of 40% by weight.

Another consequence of this slow or difficult flow of compositions containing or not containing fillers is a poor surface appearance of the moulded articles. This is because the fillers, such as fibres, are visible at the surface of the article. In order to overcome this problem, provision has been made for the addition of an amorphous polymer or a polymer exhibiting slower crystallization kinetics to the semi-crystalline matrix, in particular when the latter is a poly(hexamethylene adipamide).

Provision has also been made to use low molecular weight polymers in order thus to improve the filling of the moulds, such as, for example, in U.S. Pat. No. 5,274,033. However, the mechanical properties of the material are reduced.

Polyamides exhibiting a star structure obtained with polyfunctional aromatic compounds are described in U.S. Pat. No. 5,346,984. However, these polymers exhibit an entirely star-type structure and have low molecular weights. These two characteristics limit their use in the manufacture of moulded articles or in industrial and technical applications, because their mechanical properties are inadequate.

One of the aims of the present invention is to overcome these disadvantages by providing a polyamide exhibiting a high fluidity in the molten state and comparable or improved mechanical properties with respect to a conventional linear polyamide. This polyamide can be used as element or component of a polymer matrix in a composition containing a high level of filler. Such a composition has a good ability to be injected in the manufacture of moulded articles.

To this end, the invention provides a polyamide composed of a mixture of macromolecular chains of following formulae I and II:

 (I)

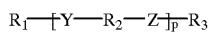 (II)

in which:

Y is the

radical when X and Z represent the

radical,
Y is the

radical when X and Z represent the

radical,

A is a covalent bond or an aliphatic hydrocarbon radical which can comprise heteroatoms and which comprises from 1 to 20 carbon atoms, preferably from 1 to 6 carbon atoms, $R_2$ is a branched or unbranched aromatic or aliphatic hydrocarbon radical comprising from 2 to 20 carbon atoms, $R_3$ and $R_4$ represent hydrogen or a hydrocarbon radical comprising a

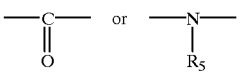

group, $R_5$ represents hydrogen or a hydrocarbon radical comprising from 1 to 6 carbon atoms, $R_1$ is an aromatic or aliphatic, linear or cyclic, hydrocarbon radical comprising at least 2 carbon atoms and which can comprise heteroatoms, m is an integer between 3 and 8 (inclusive)
n is a number between 100 and 200 (inclusive)
p is a number between 100 and 200 (inclusive).

According to another preferred characteristic of the invention, when the $R_1$ radical is not an aromatic radical, the ratio by mass of the weight of polymer chains of formula I to the total weight of polymer chains of formulae I and II is between 0.10 and 1.

When $R_1$ represents an aromatic radical, the above ratio by mass is less than 1, preferably between 0.1 and 0.9.

According to a preferred characteristic of the invention, the $R_2$ radical is a pentamethylene radical. In this embodiment, the polyamide has a structure of polycaproamide or PA 6 type.

However, other $R_2$ radicals can be used, such as undecamethylene radicals, which result in a polyamide with a structure of PA 12 type. It is also possible to obtain polyamides exhibiting $R_2$ radicals comprising 8 or 10 carbon atoms, corresponding respectively to polyamides with structures of PA9 and PA11 type.

More generally, the $R_2$ radicals which are amino acid or lactam residues are suitable for the present invention.

According to yet another preferred characteristic of the invention, the $R_1$ radical is either a cycloaliphatic radical, such as the tetravalent cyclohexanonyl radical, or a propane-1,1,1-triyl or propane-1,2,3-triyl radical.

Mention may be made, as other $R_1$ radicals which are suitable for the invention, by way of example, of substituted or unsubstituted trivalent phenyl and cyclohexanyl radicals, tetravalent diaminopolymethylene radicals with a number of methylene groups advantageously of between 2 and 12, such as the radical originating from EDTA (ethylenediaminetetraacetic acid), octovalent cyclohexanonyl or cyclohexanedionyl radicals, and radicals originating from compounds resulting from the reaction of polyols, such as glycol, pentaerythritol, sorbitol or mannitol, with acrylonitrile.

The A radical is preferably a methylene or polymethylene radical, such as the ethylene, propylene or butylene radicals, or a polyoxyalkylene radical, such as the polyoxyethylene radical.

According to a preferred embodiment of the invention, the number m is greater than 3 and advantageously equal to 3 or 4.

Thus, the polymer chains of formula I define a star polyamide comprising polyamide branches of PA 6 type in one of the preferred embodiments of the invention and a central nucleus composed of a cycloaliphatic nucleus.

These polymer chains of formula I are, in one of the preferred forms of the invention, mixed with linear polyamide chains of formula II.

The length or the molecular weight of the linear chains of formula II or of the branches of the star polyamide can be high. Thus, the linear polymer, like the chain of each branch of the star polymer, exhibits an $\overline{Mn}$ advantageously of greater than 10,000.

Another subject of the invention is a process for the manufacture of the polyamide described above. This manufacturing process consists in carrying out a polycondensation of an amino acid or of a lactam of following formulae III and IV:

$$HOOC-R_1-NH_2 \qquad (III)$$

$$R_2 \begin{array}{c} CO \\ | \\ NH \end{array} \qquad (IV)$$

in the presence of a polyfunctional compound of formula V $$R_1\text{---}[A\text{---}X\text{---}H]_m \qquad (V)$$

in which the $R_1$, $R_2$, A, X and m symbols have the meanings indicated above.

According to the invention, this polycondensation is carried out in the presence of a polycondensation initiator.

The reactive functional group of the multifunctional compound represented by the X-H symbol is a functional group capable of forming an amide functional group.

Mention may be made, as example of polyfunctional compounds of formula V, of the compound 2,2,6,6-tetra(β-carboxyethyl)cyclohexanone, the compound diaminopropane-N,N,N',N'-tetraacetic acid of following formula:

$$\begin{array}{c} HO-\overset{O}{\underset{\|}{C}}-H_2C \\ HO-\underset{\|}{\overset{O}{C}}-H_2C \end{array} N-CH_2-H_2C-N \begin{array}{c} CH_2-\overset{O}{\underset{\|}{C}}-OH \\ CH_2-\underset{\|}{\overset{O}{C}}-OH \end{array}$$

or compounds originating from the reaction of trimethylolpropane or of glycerol with propylene oxide and amination of the end hydroxyl groups; the latter compounds are sold under the trade name Jeffamines T® by the company Huntsman and have the general formula:

$$R_1 \begin{array}{c} A-NH_2 \\ -A-NH_2 \\ A-NH_2 \end{array}$$

in which:

$R_1$ represents a propane-1,1,1-triyl or propane-1,2,3-triyl radical,

A represents a polyoxyethylene radical.

The polycondensation initiators are those conventionally used in the synthesis of polyamides by polycondensation of a lactam or of an amino acid, such as the synthesis of polycaproamide.

Mention may be made, by way of example, of water, inorganic or carboxylic acids or primary amines as polycondensation initiator.

This compound is advantageously added in order to obtain a concentration by weight of between 0.5 and 5% by weight with respect to the overall mixture.

The polycondensation is carried out according to the conventional operating conditions for the polycondensation of amino acids or lactams of formula III or IV, when the polycondensation is carried out in the absence of the multifunctional compound of formula V.

Thus, the polycondensation process briefly comprises:

heating, with stirring and under pressure, the mixture of the monomers (compounds of formula III and/or IV) and of the compound of formula V with the initiator (generally water), holding the mixture at this temperature for a predetermined time and then decompressing and maintaining under a stream of inert gas (for example nitrogen) for a predetermined time at a temperature greater than the melting point of the mixture, in order thus to continue the polycondensation by removal of the water formed.

According to the process of the invention, the time for maintaining under an inert gas, or in other words for finishing the polycondensation, makes it possible to determine and to control the concentration of polymer chains of formula I in the polyamide mixture. Thus, the longer the maintenance time, the higher the concentration of polymer chains of formula I.

It is also obvious that the concentration of polymer chains of formula I or star polyamide is a function of the amount of multifunctional compound of formula V added to the mixture.

It is also possible, without on that account departing from the scope of the invention, to add, to the polycondensation mixture, other monomers comprising functional groups capable of forming amide functional groups, in order thus to obtain modified copolyamides or polyamides.

However, when these monomers are diacids or diamines, they can only be added in a small amount, advantageously to a concentration by weight of less than 20% with respect to the overall mixture.

On completion of the polycondensation, the polymer is advantageously cooled with water and extruded in the rod form. These rods are cut up to produce granules.

In order to remove non-polycondensed monomers, in particular in the case where one of the monomers is caprolactam, the granules are washed with water and then dried under vacuum.

The polymer obtained can be shaped according to conventional moulding, extrusion or spinning techniques, in order to produce moulded articles, films or yarns.

The polyamide of the invention is advantageously used as element or component of a matrix made of thermoplastic material of a composition intended to be shaped for the manufacture of moulded articles.

Such a composition is also a subject of the invention.

According to the invention, the composition comprises a polymer matrix, advantageously made of thermoplastic material, and fillers which modify the properties of the matrix, such as its mechanical, flame-retardancy or thermal, electrical or magnetic conductivity properties, or the like. Mention may be made, as examples of conventional fillers, of reinforcing fillers or bulking fillers.

According to the invention, the polymer matrix comprises, as sole constituent or one of the constituents, the polyamide in accordance with the invention.

As the polyamide in accordance with the invention exhibits a higher melt flow index than known linear polyamides, for similar molecular masses and mechanical properties, the filler-containing composition can be injected more easily into a mould, that is to say at higher rates. The composition also makes it possible to obtain more homogeneous and complete filling of the moulds, in particular when the latter have a complex shape.

The polyamide of the invention also makes it possible to prepare compositions containing a high level of fillers which can be up to 80% by weight with respect to the overall composition.

Such a composition can be injected by virtue of the high melt flow index of the polyamide of the invention. The mechanical properties of this composition are high because they are generally improved when the level of filler increases.

Mention may be made, as suitable bulking or reinforcing fillers for the invention, of the fillers commonly used to reinforce compositions made of polymer material, such as fibrous fillers comprising inorganic fibres, such as, for example, glass fibres, carbon fibres or ceramic fibres, or fibres made of synthetic material, such as polyaramide fibres, or powder fillers, such as talc, montmorillonite or kaolin, for example.

Powder fillers are also used to improve the flame retardancy of the composition. Such fillers are, for example, metal compounds, such as magnesium hydroxide or aluminium hydroxide.

Glass fibres are the preferred reinforcing filler of the invention.

According to another preferred characteristic of the invention, the polymer matrix of the composition is composed of a mixture of the polyamide according to the invention with one or more other polymers, preferably polyamides or copolyamides.

Mention may be made, as other preferred polymers of the invention, of semi-crystalline or amorphous polyamides, such as aliphatic polyamides, semi-aromatic polyamides and more generally the linear polyamides obtained by polycondensation between an aromatic or aliphatic saturated diacid and an aliphatic or aromatic saturated primary diamine, a lactam, an amino acid or a mixture of these different monomers.

Mention may be made, by way of example, as other polymers, of poly(hexamethylene adipamide), the polyphthalamides obtained from terephthalic and/or isophthalic acid, such as the polyamide sold under the trade name Amodel, or the copolyamides obtained from adipic acid, hexamethylenediamine and caprolactam.

In this embodiment, the concentration by weight of polyamide according to the invention in the matrix can vary within a wide range and is advantageously between 30 and 80% of the overall mass of polymer matrix.

It is also advantageous, in particular in this case, for the ratio by mass of star polyamide (formula I) in the polyamide of the invention to be greater than 0.8, preferably between 0.9 and 1.

The compositions of the invention can also comprise all the conventional additives, such as flame retardants, heat and light stabilizers, waxes, pigments or the like.

Such compositions are used to prepare moulded articles for the automobile industry, electrical components, or accessories for various activities, such as sporting activities, for example.

Other details and advantages of the invention will become more clearly apparent in light of the examples given hereinbelow solely by way of indication and illustration.

EXAMPLE 1

Synthesis of a polyamide in accordance with the invention

The polymerization is carried out in a heated autoclave comprising stirring means.

4444 g of caprolactam and 136 g of 2,2,6,6-tetra($\beta$-carboxyethyl)cyclohexanone are added to the autoclave with 160 g of distilled water.

The cyclohexanone compound and its method of synthesis are described in the article "The Chemistry of Acrylonitrile II—Reactions with Ketones", JACS, 64, 2850 (1942) by Herman Alexander Buison and Thomas W. Riener.

The stirred mixture is heated to a temperature of 265° C. under 6 bar.

It is maintained at this temperature and pressure for 2 hours.

The pressure is subsequently reduced and then the autoclave is flushed with nitrogen for variable periods of time, while maintaining the temperature at 265° C.

The concentration of star polymer of formula I is determined for each flushing time.

This concentration is determined by the method developed by Farina et al. and described in the report of the 4th Italian Convention on the Science of the Macromolecule.

In summary, this method consists in calculating the ratio by mass of star polymer in the mixture by determining the concentration of amine and/or acid end groups and calculating the polydispersity index D, which is equal to $$\frac{\overline{Mw}}{\overline{Mn}}.$$

This is because, according to an article by W. Sweeny and J. Zimerman published in "Encyclopedia of Polymer Science and Technology, Vol. 10, p. 194, the classical equation for calculating the index D for a mixture of polymers is:

$$D = \frac{\overline{Mw}}{\overline{Mn}} = X_{WI}^2 D_1 + X_{WI}^2 D_2 + X_{WI} X_{W2} \left[ D_1 \frac{\overline{Mn_1}}{\overline{Mn_2}} + D_2 \frac{\overline{Mn_2}}{\overline{Mn_1}} \right] \quad (1)$$

in which:

$X_{W1}$ represents the fraction by weight of the polymer with number-average molecular weight $\overline{Mn}_1$ and polydispersity index $D_1$.

This equation is also very well suited to polymer compounds containing a multifunctional component. In fact, if there is present a mixture of linear polymer with functionality (f) equal to 2 and of star polymer with functionality (f) greater than 2, the following hypotheses may be made:

the mixture is composed solely of completely linear chains and of chains completely of star type, the length of the linear chains is equal to that of a branch of the star polymer.

According to these hypotheses, the equation (1) was converted by M. Farina to a following equation (2):

$$D = 2 - \frac{(f-1)^2}{f} X_{W2}^2 + \frac{(f-1)(f-2)}{f} X_{W2} \quad (2)$$

with:

$$\overline{Mn2} = f\overline{Mn1}, D1 = 2, D_2 = 1 + \frac{1}{f}$$

With such an equation, it is possible to calculate the relationship between D and the fraction by weight $X_{W2}$ of star polymer in the polymer mixture. This relationship is a function of the coefficient of functionality (f) of the multifunctional compound, as represented in the appended FIG. 1.

The equation (2) can be converted by introducing experimental parameters, such as the molar concentration Co of the multifunctional compound and the concentration, expressed as milliequivalent per kilogram, of the $NH_2$ and COOH end functional groups:

$$D = 2 - f(f-1)^2 \left( \frac{Co}{fCo + [NH_2]} \right)^2 + (f-1)(f-2) \frac{Co}{fCo + [NH_2]}$$

Thus, it is easy to calculate D and other important parameters such as:

$\overline{M_n} = 10^6 / [Co + NH_2]$ $\overline{M_w} = 2 \cdot 10^6 [10Co + NH_2] / [4Co + NH_2]^2$ $X_{w2} = [COOH - NH_2] / [COOH]$ The molten polymer is subsequently extruded in the rod form, then rapidly cooled with water and cut up into granules.

These granules are washed with distilled water for approximately 16 hours, in order to remove the non-polymerized caprolactam, and dried at 100° C. under vacuum for 48 hours.

Different polymers were manufactured with variable levels of star polyamide.

The production conditions and the characteristics of these polymers are collated in Table I below.

TABLE 1

| Polymer | Molar % of tetra-functional compounds | Flushing time | Ratio by mass of star polymer | Mn | $D = \frac{\overline{M}_w}{\overline{M}_n}$ |
|---|---|---|---|---|---|
|  | 0.5% | 60 min. | 0.60 | 10,343 | 2.04 |
| B | 0.5% | 90 min. | 0.70 | 20,630 | 1.97 |
| C | 0.5% | 120 min. | 0.90 | 19,400 | 1.46 |
| D | 0.5% | 140 min. | 1.00 | 20,900 | 1.25 |
| E | 0.3% | 90 min. | 0.70 | 21,152 | 1.8 |
| F | 0.8% | 100 min. | 0.70 | 13,661 | 1.3 |
| Comparative Ex. 1 | 0 | 90 min. | 0.00 | 19,550 | 2 |

The rheological and mechanical properties of these polymers are collated in Table II below.

TABLE II

|  | A | B | C | D | E | F | 1 |
|---|---|---|---|---|---|---|---|
| Relative viscosity[1] | 2.07 | 2.06 | 2.02 | 2.15 | 2.56 | 1.77 | 2.7 |
| Melt flow index[2] (g/10 min) | 47 | 45 | 44 | 45 | 13.5 | 70.2 | 7.5 |
| Melting temperature ° C. | 219 | 218 | 217 | 217 | 219 | 217 | 221 |
| Crystallization temperature ° C. | 181 | 179 | 178 | 176 | 179 | 177 | 175 |
| Tg ° C. | 72 | 74 | 73 | 74 | 74 | 72 | 67 |
| Notched Izod impact (J/m) | 45 | 47 | 42 | 40 | 47.3 | 32 | 38.4 |
| Flexural modulus (MPa) | 2400 | 2400 | 2500 | 2500 | 3300 | 2700 | 2500 |
| Elongation % | 160 | 140 | 100 | 80 | 140 | 70 | 100 |
| Tensile strength (MPa) | 78 | 78 | 76 | 80 | 78 | 80 | 78 |

[1]Relative viscosity measured from a 1% solution of polymer in 96% $H_2SO_4$
[2]Melt flow index (MFI) determined according to ASTM Standard D1238

These results clearly show that, for equivalent molecular masses, the melt flow index increases sharply when the concentration of multifunctional compound reaches approximately 0.50%.

EXAMPLE 2

Filler-containing compositions

Compositions comprising a polyamide matrix are provided with glass fibres as filler by mixing in the molten state in a twin-screw extruder of Werner & Pfleiderer ZSK 40 type.

Thus, compositions containing 50% by weight of glass fibres are prepared respectively with a conventional PA 6 or a polyamide in accordance with the invention exhibiting a ratio by mass of star polymer equal either to 0.78 or to 0.98.

The parameters for preparing the mixture and for carrying out the extrusion are collated in the following Table III:

TABLE III

| Matrix | PA 6 | Polyamide with ratio by mass of star polymer equal to 0.78 | Polyamide with ratio by mass of star polymer equal to 0.98 |
|---|---|---|---|
| Extrusion temperature | 250° C. | 250° C. | 250° C. |
| Speed of rotation of the screw (revolutions per min) | 260 | 260 | 260 |
| Composition throughput (kg/h) | 40 | 40 | 40 |
| Torque of the motor (N.m.) | 42 | 28 | 23 |
| Motor power consumption, expressed in amperes (A) | 34 | 30 | 25 |

The properties of these compositions are collated in Table IV below.

TABLE IV

| Matrix | PA 6 | Polyamide with ratio by mass of star polymer equal to 0.78 | Polyamide with ratio by mass of star polymer equal to 0.98 |
|---|---|---|---|
| Modulus (MPa) | 15,350 | 15,935 | 15,792 |
| Notched Izod impact (J/m) | 124 | 139.3 | 128.3 |
| Unnotched Izod impact (MPa) | 94 | 96 | 95 |
| HDT (° C.) (1) | 215 | 214 | 215 |
| Melt flow index (g/10 min) | 6 | 12.5 | 12 |
| Spiral test (cm) (2) | 25 | 50 | 46 |

(1) Measured according to ASTM Standard D648 under a load of 1.82 N/mm$^2$
(2) This test consists in injecting the composition into a spiral-shaped mould with a thickness of 1 mm and a width of 40 mm under a Battenfeld press of 180 tonnes at a temperature of 270° C., a mould temperature of 80° C. and an injection pressure of 80 kg/cm$^2$. The injection time is 1.5 seconds. The result of the test is determined by the length of mould correctly filled by the composition.

Likewise, a composition comprising 60% by weight of glass fibres and, as matrix, a polyamide of PA6 type with a ratio by mass of star polymer equal to 0.78 is prepared according to the process described above with the following mixing and extrusion conditions:

Temperature: 250° C.

Speed of rotation of the screw:

260 revolutions per min.

Throughput of the composition: 40 kg/h

The properties of this composition are shown in Table V below, in comparison with a composition comprising 60% by weight of glass fibres and, as matrix, a linear PA6 polyamide with an identical molecular weight:

TABLE V

| Matrix | PA 6 with 60% of glass fibres | Polyamide with ratio by mass of star polymer equal to 0.78 |
|---|---|---|
| Modulus (MPa) | 18,556 | 20,251 |
| Notched Izod impact (J/m) | 123 | 118 |
| Unnotched Izod impact (MPa) | 83 | 86 |
| HDT (° C.) (1) | 215 | 215 |
| Spiral test (cm) (2) | 24 | 35 |
| Torque of the motor (N.m) | 43 | 32 |
| Motor power consumption, expressed as amperes (A) | 35 | 25 |

EXAMPLE 3

Synthesis of a second polymer type in accordance with the invention

A polyamide in accordance with the invention is manufactured, according to a procedure identical to that of Example 1, from a following mixture of monomers:

4444 g of caprolactam 54 g of 1,3-diaminopropane-N,N,N',N'-tetraacetic acid 160 g of distilled water The properties of the polymer (G) obtained are collated in Table VI below.

EXAMPLE 4

Synthesis of a third polymer type in accordance with the invention

A polyamide in accordance with the invention is manufactured, according to a procedure identical to that of Example 1, from a following mixture of monomers:

4444 g of caprolactam 71 g of Jeffamines T 403, sold by the company Huntsman 160 g of distilled water The properties of the polymer (H) obtained are collated in Table VI below.

A polymer (J) was manufactured with the same compounds of the example above but using 142 g of Jeffamines instead of 71 g. The properties of this polymer are collated in Table VI.

A polymer of conventional polyamide type was prepared under the same conditions, as comparative example, but using, as monomers, solely a mixture containing 4444 g of caprolactam and 160 g of water. The properties of this polymer 2 are shown in Table VI.

TABLE VI

|  | G | H | J | 2 |
|---|---|---|---|---|
| Relative viscosity (1) | 2.15 | 2.05 | 1.70 | 2.70 |
| Number of amine endings (meq/kg) | 26 | 104 | 190 | 52 |
| Number of acid endings (meq/kg) | 115 | 20 | 17 | 50 |
| Melt flow index (2) (g/10 min) | 26 | 13 | 35 | 7.5 |
| Melting temperature ° C. | 219 | 218 | 216 | 221 |
| Crystallization temperature ° C. | 174 | 172 | 168 | 175 |
| Notched Izod impact | 48 | 49 | 44 | 38.4 |

TABLE VI-continued

|  | G | H | J | 2 |
|---|---|---|---|---|
| (J/m) |  |  |  |  |
| Flexural modulus (MPa) | 2535 | 2690 | 2782 | 2500 |
| Elongation % | 145 | 59 | 42 | 100 |
| Tensile strength (MPa) | 65 | 73 | 72 | 78 |

(1) Relative viscosity measured from a 1% solution of polymer in 96% $H_2SO_4$
(2) Melt flow index (MFI) determined according to ASTM Standard D1238

EXAMPLE 5

Filler-containing compositions

Compositions were prepared by extrusion, with a Werner ZSK 40 extruder at a temperature of 250° C., of a mixture comprising, as polymer matrix, a polymer prepared in Examples 3 and 4 and 50% by weight of glass fibres with respect to the mass of the overall composition.

The properties of these compositions are collated in Table VII below:

TABLE VII

| Matrix | Polymer 2 (PA 6) | Polymer G | Polymer H | Polymer J |
|---|---|---|---|---|
| Modulus (MPa) | 15,300 | 15,060 | 15,200 | 15,100 |
| Notched Izod impact (J/m) | 124 | 121 | 121 | 123 |
| Tensile strength (N/mm²) | 220 | 216 | 214 | 211 |
| HDT (° C.) (1) | 211 | 210 | 207 | 208 |
| Melt flow index (g/10 min) | 5.2 | 13.7 | 9.3 | 14.4 |
| Spiral test (cm) (2) | 21.5 | 35 | 43 | 45 |

(1) Measured according to ASTM Standard D648 under a load of 1.82 N/mm²
(2) This test consists in injecting the composition into a spiral-shaped mould with a thickness of 1 mm and a width of 40 mm under a Battenfeld press of 180 tonnes at a temperature of 270° C., a mould temperature of 80° C. and an injection pressure of 80 kg/cm². The injection time is 1.5 seconds. The result of the test is determined by the length of mould correctly filled by the composition.

What is claimed is:

1. Polyamide comprising macromolecular chains corresponding to the following formulae:

 (I)

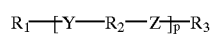 (II)

in which:

Y is the

radical when X and Z represent the

radical,

Y is the

radical when X and Z represent the

radical,

A is a covalent bond or an aliphatic hydrocarbon radical which can comprise heteroatoms and which comprises from 1 to 20 carbon atoms, $R_2$ is a branched or unbranched aromatic or aliphatic hydrocarbon radical comprising from 2 to 20 carbon atoms, $R_3$ and $R_4$ represent hydrogen or a hydrocarbon radical comprising a

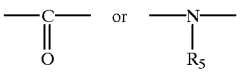

group, $R_5$ represents hydrogen or a hydrocarbon radical comprising from 1 to 6 carbon atoms, $R_1$ is a linear aliphatic, arylaliphatic or cycloaliphatic hydrocarbon radical comprising at least 2 carbon atoms and which can comprise heteroatoms, m represents an integer between 3 and 8 n represents a number between 100 and 200 p represents a number between 100 and 200 the ratio by mass of the weight of polymer chains of formula I to the total weight of polymer chains of formulae I and II is between 0.10 and 1.

2. Polyamide comprising macromolecular chains corresponding to the following formulae:

 (I)

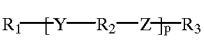 (II)

in which:

Y is the

radical when X and Z represent the

radical,

Y is the

radical when X and Z represent the

radical,

A is a covalent bond or an aliphatic hydrocarbon radical which can comprise heteroatoms and which comprises from 1 to 20 carbon atoms, $R_2$ is a branched or unbranched aromatic or aliphatic hydrocarbon radical comprising from 2 to 20 carbon atoms, $R_3$ and $R_4$ represent hydrogen or a hydrocarbon radical comprising a

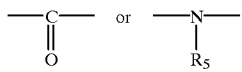

group, $R_5$ represents hydrogen or a hydrocarbon radical comprising from 1 to 6 carbon atoms, $R_1$ is an aromatic hydrocarbon radical which can comprise heteroatoms, m represents an integer between 3 and 8 n represents a number between 100 and 200 p represents a number between 100 and 200 the ratio by mass of the weight of polymer chains of formula I to the total weight of polymer chains of formulae I and II is less than 1.

3. Polyamide according to claim 1, wherein $R_2$ is a pentamethylene radical.

4. Polyamide according to claim 1, wherein $R_1$ represents the cyclohexanonetetrayl radical, the propane-1,1,1-triyl radical, the propane-1,2,3-triyl radical or the

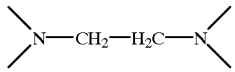

radical.

5. Polyamide according to claim 1, wherein A represents a methylene, polymethylene or polyoxyalkylene radical.

6. Polyamide according to claim 1, wherein m is equal to 3 or 4.

7. Process for the manufacture of a polyamide according to claim 1, said process comprising polycondensing an amino acid of formula:

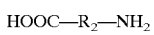

and/or a lactam of

formula in the presence of a polyfunctional compound of formula

in which A, $R_1$, $R_2$, X and m have the meanings set forth in claim 1, in the presence of a polycondensation initiating compound.

8. Process according to claim 7, wherein the polycondensation initiator is water, an inorganic or carboxylic acid or a primary amine.

9. Process according to claim 7, wherein the polyfunctional compound of formula (V) is chosen from the group comprising the compound 2,2,6,6-tetra(β-carboxyethyl)cyclohexanone, the compound diaminopropane-N,N,N',N'-tetraacetic acid, and the triamines obtained by reaction of propylene oxide with trimethylolpropane or glycerol and amination of the hydroxyl ends.

10. Process according to claim 7, wherein the concentration by weight in the reaction mass of polycondensation initiator is between 0.5% and 5%.

11. Composition comprising a polymer matrix and fillers, wherein the polymer matrix comprises at least one polyamide according to claim 1.

12. Composition comprising a polymer matrix and fillers consisting essentially of a polyamide according to claim 1.

13. Composition comprising a polymer matrix and fillers, wherein said polymer matrix comprises a mixture of a linear polyamide and of a polyamide according to claim 1.

14. Composition according to claim 13, wherein the polyamide is present at a concentration by weight of between 30% and 80% with respect to the total mass of polymer matrix.

15. Composition according to claim 14, wherein the polyamide has a ratio by mass of star polymer greater than 0.8.

16. Composition according to claim 13, wherein the linear polyamide is chosen from polyamides obtained by polycondensation between an aromatic or aliphatic saturated diacid and an aliphatic or aromatic saturated primary diamine, a lactam, an amino acid or a mixture of these different monomers.

17. Composition according to claim 16, wherein the linear polyamide is an aliphatic and/or semi-crystalline polyamide or copolyamide chosen from the group comprising PA 66, PA 6, PA 4.6 and PA 12 or a semi-crystalline semiaromatic polyamide or copolyamide chosen from the group consisting of polyphthalamides.

18. Composition according to claim 11, wherein the concentration by weight of filler is less than 80 % by weight of the composition.

19. Composition according to claim 11, wherein the fillers are reinforcing or bulking fillers chosen from the group comprising fibrous fillers, chosen from the group composed of glass, carbon or inorganic fibres or fibres made of thermosetting material, or powder fillers.

20. Composition according to claim 11, wherein the fillers are flame-retardant fillers.

21. Polyamide according to claim 2, wherein $R_2$ is a pentamethylene radical.

22. Polyamide according to claim 2, wherein A represents a methylene, polymethylene or polyoxyalkylene radical.

23. Polyamide according to claim 2, wherein m is equal to 3 or 4.

24. Process for the manufacture of a polyamide according to claim 2, said process comprising polycondensing an amino acid of formula:

$$HOOC-R_2-NH_2 \quad (III)$$

and/or a lactam of formula $$R_2\begin{matrix}CO\\|\\NH\end{matrix} \quad (IV)$$

in the presence of a polyfunctional compound of formula $$R_1-[A-X-H]_m \quad (V)$$

in which A, $R_1$, $R_2$, X and m have the meanings set forth in claim 2, in the presence of a polycondensation initiating compound.

25. Process according to claim 24, wherein the polycondensation initiator is water, an inorganic or carboxylic acid or a primary amine.

26. Process according to claim 24, wherein the polyfunctional compound of formula (V) is chosen from the group comprising the compound 2,2,6,6-tetra(β-carboxyethyl)cyclohexanone, the compound diaminopropane-N,N,N',N'-tetraacetic acid, and the triamines obtained by reaction of propylene oxide with trimethylolpropane or glycerol and amination of the hydroxyl ends.

27. Process according to claim 24, wherein the concentration by weight in the reaction mass of polycondensation initiator is between 0.5% and 5%.

28. Composition comprising a polymer matrix and fillers, wherein the polymer matrix comprises at least one polyamide according to claim 2.

29. Composition comprising a polymer matrix and fillers consisting essentially of a polyamide according to claim 2.

30. Composition comprising a polymer matrix and fillers, wherein said polymer matrix comprises a mixture of a linear polyamide and a polyamide according to claim 2.

31. Composition according to claim 30, wherein said polyamide is present at a concentration by weight of between 30% and 80% with respect to the total mass of polymer matrix.

32. Composition according to claim 31, wherein said polyamide has a ratio by mass of star polymer greater than 0.8.

33. Composition according to claim 30, wherein the linear polyamide is chosen from polyamides obtained by polycondensation between an aromatic or aliphatic saturated diacid and an aliphatic or aromatic saturated primary diamine, a lactam, an amino acid or a mixture of these different monomers.

34. Composition according to claim 33, wherein the linear polyamide is an aliphatic and/or semi-crystalline polyamide or copolyamide chosen from the group comprising PA 66, PA 6, PA 4.6 and PA 12 or a semi-crystalline semiaromatic polyamide or copolyamide chosen from the group consisting of polyphthalamides.

35. Composition according to claim 28, wherein the concentration by weight of filler is less than 80% by weight of the composition.

36. Composition according to claim 28, wherein the fillers are reinforcing or bulking fillers chosen from the group comprising fibrous fillers, chosen from the group composed of glass, carbon or inorganic fibres or fibres made of thermosetting material, or powder fillers.

37. Composition according to claim 28, wherein the fillers are flame-retardant fillers.

38. Polyamide according to claim 2, wherein the ratio by mass of the weight of polymer chains of formula I to the total weight of polymer chains of formulae I and II is less than 0.9.

* * * * *